United States Patent
Caronni et al.

(10) Patent No.: US 6,920,330 B2
(45) Date of Patent: Jul. 19, 2005

(54) APPARATUS AND METHOD FOR THE USE OF POSITION INFORMATION IN WIRELESS APPLICATIONS

(75) Inventors: Germano Caronni, Mountain View, CA (US); Ann Sofie Nystrom, Drammen (NO)

(73) Assignee: Sun Microsystems, Inc., Santa Clara, CA (US)

( * ) Notice: Subject to any disclaimer, the term of this patent is extended or adjusted under 35 U.S.C. 154(b) by 518 days.

(21) Appl. No.: 10/107,717

(22) Filed: Mar. 26, 2002

(65) Prior Publication Data

US 2004/0203846 A1 Oct. 14, 2004

(51) Int. Cl.[7] .................................................. H04Q 7/20
(52) U.S. Cl. ........................ 455/456.1; 455/456.5; 455/41.2; 455/88; 342/450; 342/458; 342/463; 709/227; 709/203; 713/201
(58) Field of Search ............................. 455/456.1–457, 455/414.2, 41.2–41.3, 500, 507, 88, 556.1, 90.3; 342/450, 457–458, 463; 709/227, 203, 208; 701/300; 713/200–201

(56) References Cited

U.S. PATENT DOCUMENTS

| | | | |
|---|---|---|---|
| 5,955,994 A | * 9/1999 | Staker et al. | 343/700 MS |
| 6,140,964 A | * 10/2000 | Sugiura et al. | 342/464 |
| 6,222,440 B1 | * 4/2001 | Heller | 340/10.3 |
| 6,310,576 B1 | * 10/2001 | Johnson | 342/465 |
| 6,414,635 B1 | * 7/2002 | Stewart et al. | 342/457 |
| 6,717,516 B2 | * 4/2004 | Bridgelall | 340/572.1 |
| 6,765,484 B2 | * 7/2004 | Eagleson et al. | 340/505 |
| 6,775,616 B1 | * 8/2004 | Nysen | 701/300 |
| 2002/0066030 A1 | * 5/2002 | Brawn et al. | 713/201 |
| 2002/0102995 A1 | * 8/2002 | Zelmanovich et al. | 455/456 |
| 2003/0060212 A1 | * 3/2003 | Thomas | 455/456 |
| 2003/0225893 A1 | * 12/2003 | Roese et al. | 709/227 |
| 2004/0147270 A1 | * 7/2004 | Petrovich | 455/456.3 |
| 2004/0160323 A1 | * 8/2004 | Stilp | 340/572.1 |

* cited by examiner

Primary Examiner—Sonny Trinh
Assistant Examiner—Marcos L Torres
(74) Attorney, Agent, or Firm—Gunnison, McKay & Hodgson, L.L.P.

(57) ABSTRACT

Embodiments of the present invention are directed at gathering position information of mobile and stationary entities and using the position information in a wide variety of applications. Various embodiments use a plurality of signal transmitting devices and/or a plurality of signal gathering devices to gather position information. In one embodiment, the signal transmitting device is an existing mobile electronic device. In another embodiment, the signal transmitting device is a radio frequency identification (RFID) tag attached to an entity. In another embodiment, the signal gathering device is a collection of wall mounted antennas. The entity location is calculated by gathering the phase difference or other timing information of signal generated by the signal transmitting device on the entity. This location information is then given to end user applications. One embodiment is a network security application using gathered location information of wireless ethernet cards. Another embodiment is a network resource locator application.

6 Claims, 16 Drawing Sheets

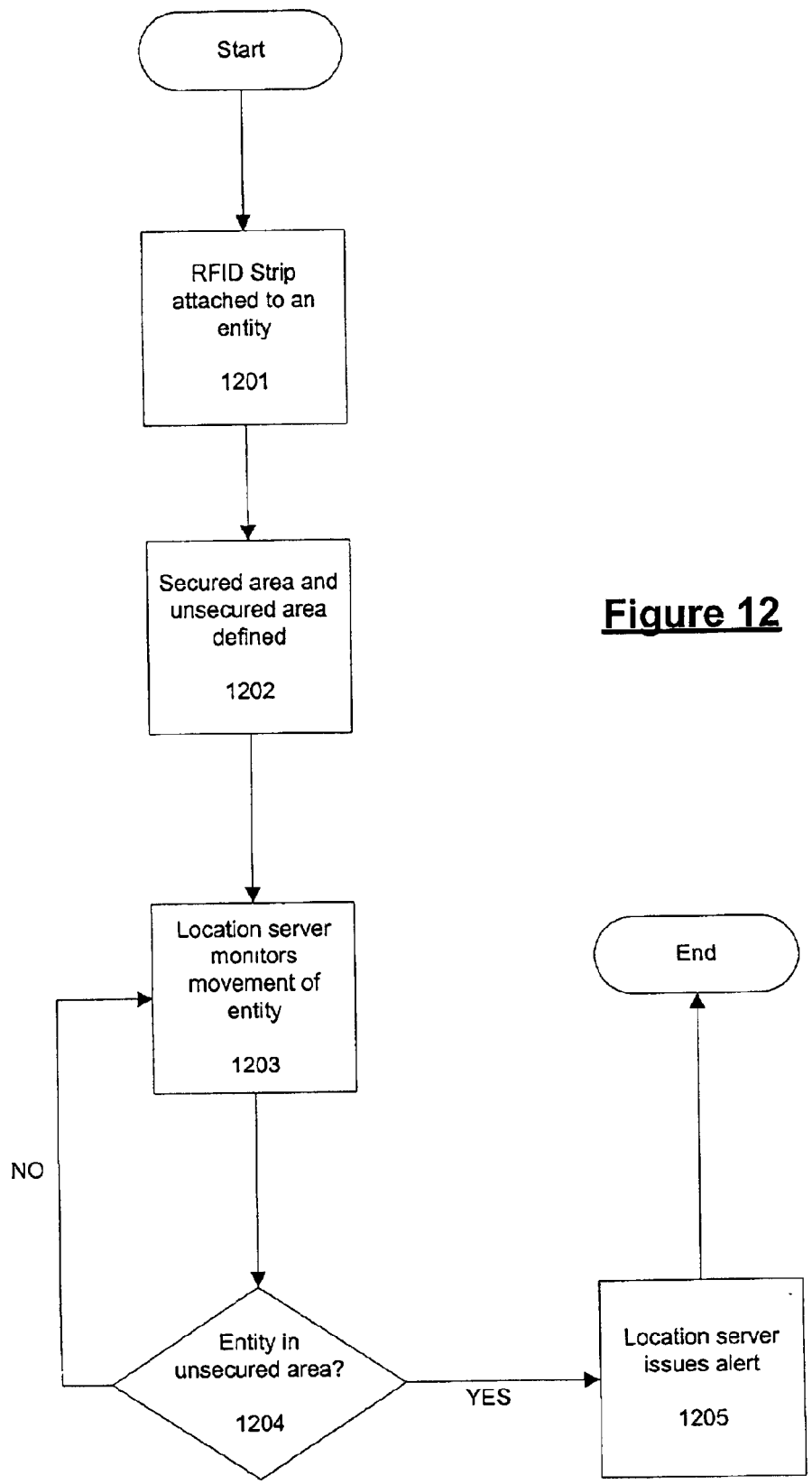

APPARATUS AND METHOD FOR THE USE OF POSITION INFORMATION IN WIRELESS APPLICATIONS

BACKGROUND OF THE INVENTION

1. Field of the Invention

The present invention relates to the field of electronic communications, and in particular to an apparatus and a method for the use of position information in wireless applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

Electronic communications are routed with the intention that they reach the same physical location of the intended recipient. Some intended recipients are mobile using wireless means of communication. It is difficult to route communications to the physical location of a recipient, especially if the recipient is mobile, without being able to pinpoint the exact physical location of the recipient. Portable communications devices, like personal digital assistants (PDAs), and cellular phones, to name a few, attempt to reduce or eliminate this problem. This problem can be better understood by a review of electronic communications.

Electronic Communications

In electronic communications, one entity attempts to establish a connection to another entity either for the purpose of one-way or two-way data transfers via an electronic connection, or to gather its location information. Common examples of present electronic communications include e-mail messages, computer chat, paging, and phone calls. The success of attempts at electronic communication depends upon routing the communication to the physical location of the recipient. For example, to complete a phone call to a person, that person must be physically present to answer the phone when the phone rings. A more reliable way to electronically detect, track, and control a variety of items is to use radio frequency identification (RFID) technology.

Mobile users increase the difficulty in correctly routing electronic communication attempts. When a person leaves home, typically, a call placed to the home phone number will fail to reach that person, or conversely a call placed to the cellular phone number will fail to reach that person if the physical location of the cellular phone cannot be pinpointed.

Routing to Mobile Users

One prior art solution involves the use of mobile communications devices. Electronic communications that are routed to a mobile communications device are successfully completed whenever the mobile communications device is with the intended recipient. For example, phone calls, pages and e-mail are routed to a cellular phone which the intended recipient keeps in close proximity. However, the use of such mobile communications devices is expensive. Additionally, mobile communications devices fail to function properly in certain locations.

Another prior art solution involves rerouting electronic communications. A person uses a forwarding device to reroute electronic communications originally sent to one device so that they are instead sent to another device. For example, if a user is going on vacation and will not be able to access messages sent to a primary address, the user configures a program to forward all e-mail messages sent to the primary e-mail address to a secondary e-mail address the user can access while on vacation. In another example, a user leaving home to visit another person's house sets a device to forward calls made to the user's home phone number to the other person's home phone number.

In this method, the user must configure the rerouting mechanism whenever the user changes locations. This is time consuming. Additionally, the user risks mis-configuring the forwarding device. A mis-configuration could lead to electronic communications being lost or routed to unacceptable locations. Furthermore, the rerouting mechanism may not be able to locate the new device to reroute the electronic communications because the new device uses a different kind of communications network, for example wireless or radio frequency, which fails to function properly under certain conditions.

Radio-Frequency Identification (RFID) Technology

RFID technology provides a quick, flexible, and reliable way to electronically detect, track, and control a variety of items. Prior art RFID systems use radio transmissions to send energy to a transponder (or RFID tag), which in turn emits a unique identification code back to the data collection reader (or Interrogator) linked to an information management system. These prior art systems utilize two separate antennas—one on the transponder, and one on the reader—to accomplish the task of data transfer by radio signals back to the data management system. The data collected from the transponder can be sent, for example, to a host computer through standard interfaces, or it can be stored in a portable reader and up-loaded later to a computer for data processing.

FIG. 8 illustrates a scenario of a prior art system transferring data using RFID technology. Data collection reader 800 sends an inquiry to locate a RFID tag in the form of an energy wave 810 via antenna 820 built into it. Transponder 830 responds to this energy wave by sending a unique identification code 840 back to reader 800 via antenna 850 built into it. This unique identification code and other similar data transferred between the reader and the transponder is sent via a standard interface 860 to computer 870 for appropriate action.

An RFID transponder is a combination of a radio and data memory on an integrated circuit chip attached to an antenna. Prior art transponders have varying read and write functionality, power sources, and operating frequencies that govern their performance capability. Some of the common prior art transponder functional types include read only (R/O), write once read many (WORM), and read/write (R/W). Common prior art transponder power sources include active and passive transponders, while common prior art transponder operating frequencies include low frequency—operating at 125 kHz, high frequency—operating at 13.56 MHz, and ultra high frequency—operating within the range of 433–915 MHz and 2.45 GHz.

Common examples of RFID systems in use today include toll-way pass systems where a battery operated transponder emits a RF signal directly from a vehicle as it approaches a toll-way gate on a freeway, automatic retail refueling systems, for example the SpeedPass® promoted by a gasoline retailer, and access control systems where a RFID transponder is embedded in an employee personnel ID badge to enable hands-free access to secured buildings and a tamperproof form of identification ensuring that only authorized personnel are admitted.

Accurately gathering and pinpointing location information of both stationary and mobile recipients in this 'smart everything' world is an expensive and tedious task. It would be useful if the physical location of a recipient can be accurately pinpointed without altering the basic design or functionality of the recipient or the way this information is gathered and relayed to an end user application.

SUMMARY OF THE INVENTION

The present invention is an apparatus and a method for the use of position information in wireless applications. Embodiments of the present invention leverage existing wireless technology to derive the location information of an entity and use such location information in a wide variety of end user applications. The entity may be, for example, a device like a printer or a computer, a book in a library, an employee of a company, a wireless Local Area Network (LAN) Personal Computer Memory Card International Association (PCMCIA) card, a Bluetooth™ transmitter, or household items like furniture, television, or other household gadgets. According to one embodiment of the present invention, the location information of an entity is relayed by a signal transmitting device and received by a signal gathering device.

According to one embodiment of the present invention, the signal transmitting device is a mobile electronic device such as a Bluetooth™ transmitter. Since such a device already uses radio signal (or infrared emanation) in its normal operation, there is no need to modify its components to track the device's location. A signal gathering device passively listens for signal activity from the device to calculate its location. According to another embodiment of the present invention, the signal transmitting device is a radio frequency identification (RFID) tag attached to an entity whose location information is needed.

According to another embodiment of the present invention, the signal gathering device is a collection of wall mounted antennas. In one embodiment, one of these antennas send out query signals and all antennas in the same indoor space gather response signal from a passive RFID tag attached to an entity or from RFID transceivers embedded in entities like a book, an employee, or a printer to calculate the location where the response signal is sent. According to another embodiment of the present invention, this location information is gathered by the wall-mounted antennas by passively listening to the radio or infrared signal emitted by active devices like a Bluetooth™ transmitter. By gathering the phase difference or other timing information of the radio or infrared signal the receiving antenna can calculate the location of the entity. This location information is then given to other systems such as access control mechanisms, data banks, or end user applications that use this information as necessary. One embodiment of the present invention presents a network security application using gathered location information of ethernet LAN PCAMIA cards. Another embodiment of the present invention presents a network resource locator application.

BRIEF DESCRIPTION OF THE DRAWINGS

These and other features, aspects and advantages of the present invention will become better understood with regard to the following description, appended claims and accompanying drawings where:

FIG. 12 illustrates the operation of a security application according to an embodiment of the present invention.

DETAILED DESCRIPTION OF THE INVENTION

The present invention is an apparatus and a method for the use of position information in wireless applications. In the following description, numerous specific details are set forth to provide a more thorough description of embodiments of the invention. It will be apparent, however, to one skilled in the art, that the embodiments of the present invention may be practiced without these specific details. In other instances, well known features have not been described in detail so as not to obscure the invention Embodiments of the present invention are directed at gathering position information of mobile and stationary entities and using the position information in a wide variety of applications. Embodiments of the present invention use a plurality of signal transmitting devices and/or a plurality of signal gathering devices to gather position information of devices, objects and persons. Embodiments of the present invention use the position information gathered for security, tracking and other purposes.

Figure 1:
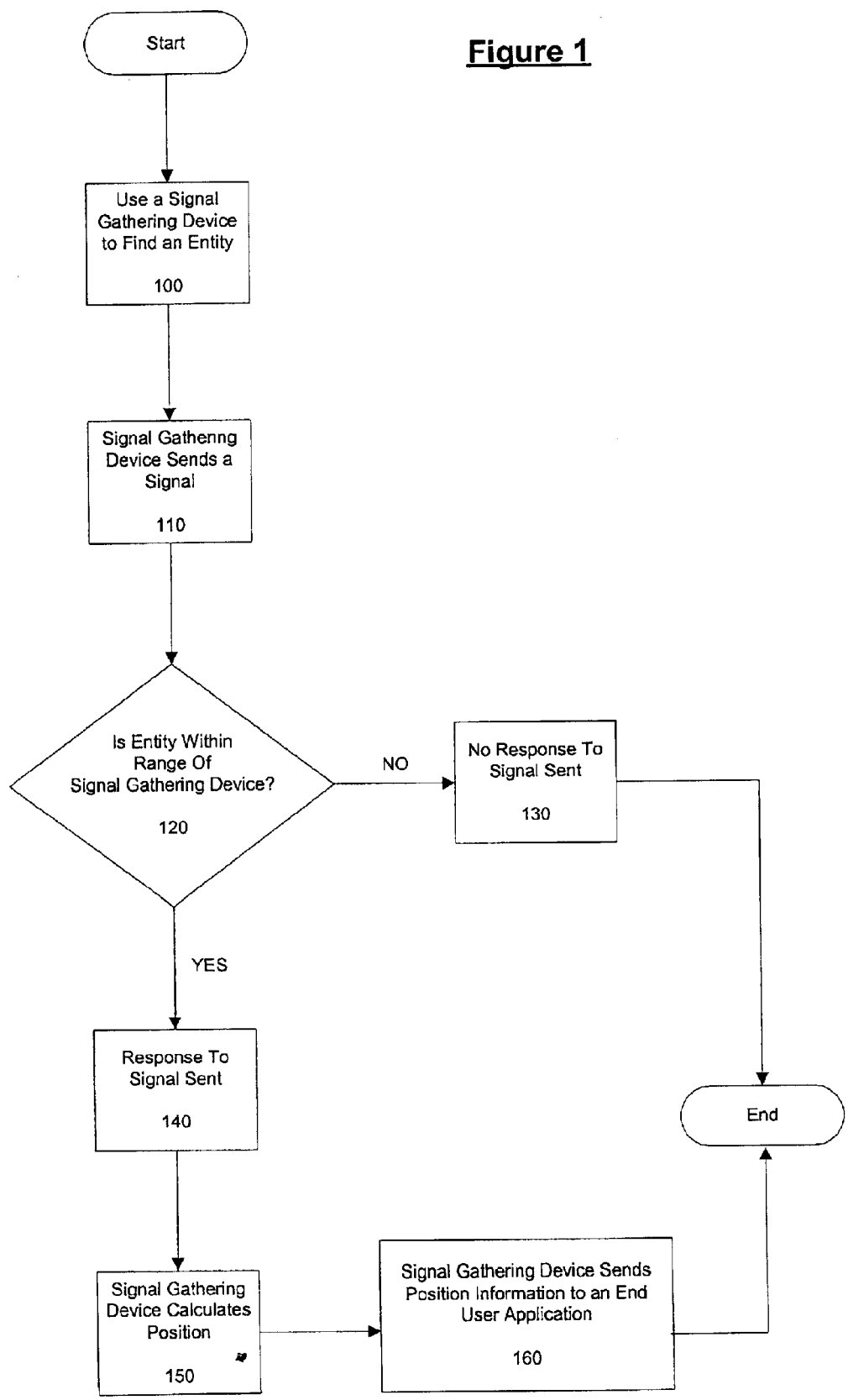
FIG. 1 illustrates a scenario where a signal gathering device is used to find position information of an entity according to an embodiment of the present invention.

FIG. 1 illustrates a scenario where a signal gathering device is used to find position information of an entity needed by an end user application. An end user application can be an access control mechanism, a data bank, or any technology that needs location information. At block 100, a signal gathering device is used to find the entity. At block 110, the signal gathering device sends a signal. At block 120, if the entity is not present, or within range of the signal gathering device, then at block 130 no return signal is received by the signal gathering device. If at block 120 the entity is present or within range, then at block 140, the signal transmitting device on the entity returns a signal to the signal gathering device indicating the presence of the entity. At block 150, the signal gathering device calculates the position of the entity, and at block 160 this information is forwarded to the end user application.

In one such embodiment the signal gathering device sends the signal at a fixed time interval that is terminated after a clock-out time, and the results are forwarded to the end user application that needs the positioning information of the entity. With the location information, the end user application can take appropriate steps. For example, if the end user application is an access control mechanism and the entity is the identification tag of an employee, then access is denied to the employee unless the tag is in range of the signal gathering device. It must also be noted that the embodiment allows the end user application (in this case, the access control mechanism) to decide on a course of action based on the location information received. Therefore the possibility exists that access may still be denied to the employee for other reasons even if the employee tag is in range.

Mobile Electronic Devices

In one embodiment of the present invention, existing wireless technology is leveraged to derive the location information of a mobile electronic device without modification to its components. As many mobile electronic devices already emit signals in their normal operation, this embodiment employs a signal gathering device to receive their signals for position calculation. Thus a signal from a mobile electronic device, which travels with a mobile user, can be used to locate the user or the device itself.

In one embodiment, this device is a cellular phone. In another embodiment, this device is a personal directory assistant (PDA). In another embodiment, this device is a device that employs radio signal (or infrared emanation) emitted by active devices like a Bluetooth™ transmitter. The present invention is not limited to the three embodiments mentioned above, and can be used in other devices and technologies that use wireless transmission. Once the signal sensing device determines that a mobile user is present, it calculates its location and relays that information to other systems such as access control mechanisms, data banks, or end user applications.

Figure 2:
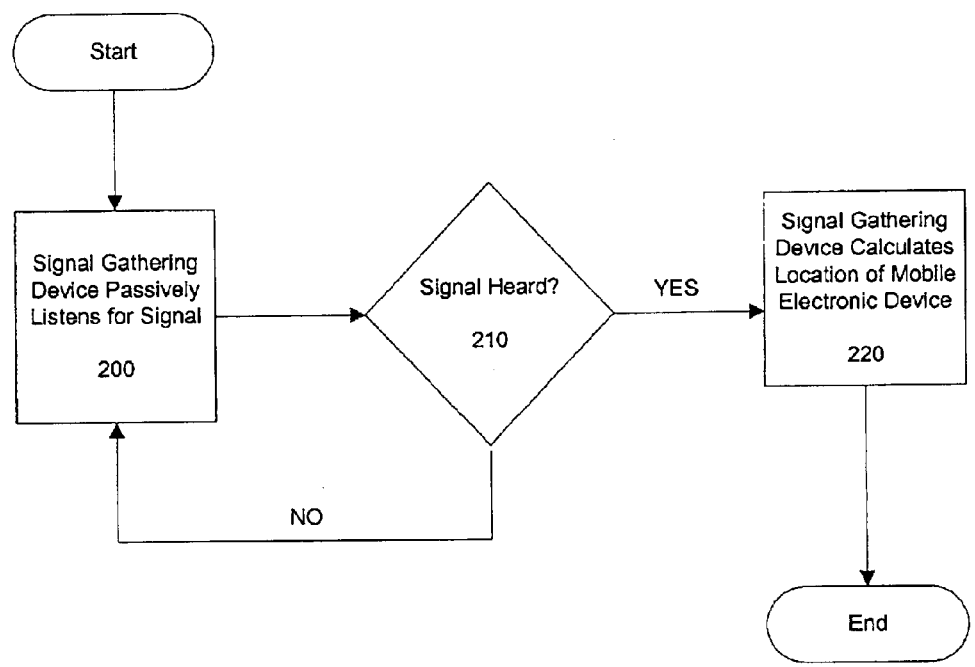
FIG. 2 illustrates a scenario whereby a signal from a mobile electronic device is used to pinpoint location information of the device according to an embodiment of the present invention.

FIG. 2 illustrates a scenario whereby a signal from a mobile electronic device is used to pinpoint location of the device. At block 200, the signal gathering device passively listens for signal. In one embodiment, the signal gathering device is a collection of antennas. The signal can be radio signal or infrared emanation or any signal emitted by mobile electronic device. If a signal is heard at block 210, then at block 220 signal gathering device calculates the location of the mobile electronic device. The location information can then be sent to the end user application. For example, the information can be used to update a location databank. If at block 210 no signal is heard, the signal gathering device goes back to passively listening for a signal.

Signal Transmitting Devices

According to one embodiment of the present invention, signal transmitting devices are added to existing objects or devices to allow for location calculation. The signal emitted by a signal transmitting device is collected by a signal gathering device to enable location calculation. In one embodiment, a signal transmitting device is attached to a stationary object. For example, given an indoor space like a home, shop, library, or office, it may be necessary to pinpoint the location of a stationary entity like a phone, radio, television, computer, or VCR. A signal transmitting device can be attached to each of such entities.

Figure 3:
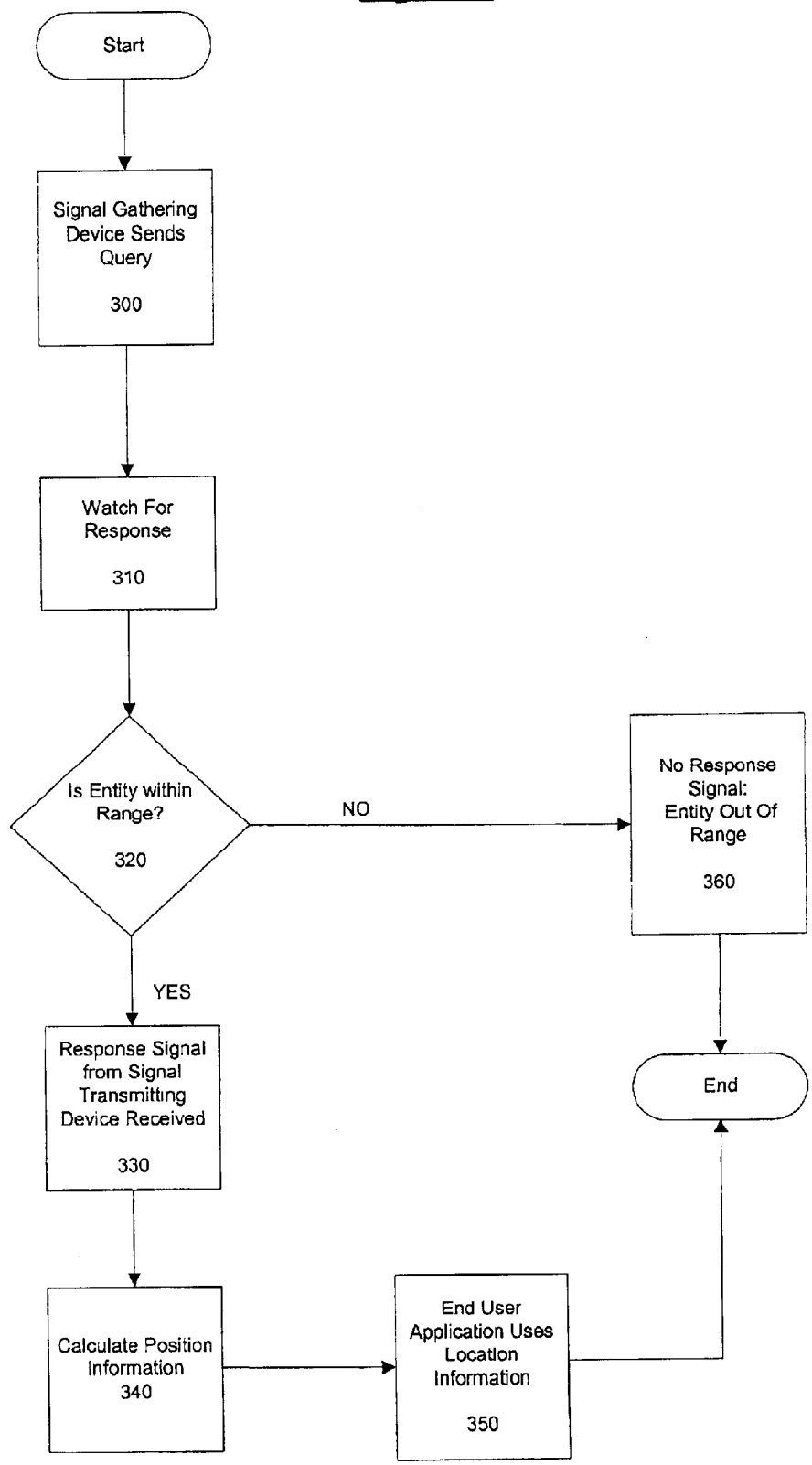
FIG. 3 illustrates a scenario where a signal gathering device and a signal transmitting device are used according to an embodiment of the present invention.

FIG. 3 illustrates a scenario where the location of one such entity mentioned above needs to be pinpointed. At block 300, a signal (or query) is transmitted from a signal gathering device. In one embodiment, the signal gathering device is a collection of antennas. At block 310, the signal gathering device watches for a response to its query. At block 320, if the signal transmitting device that is attached to the entity in question is within the indoor space or the range of the signal gathering device, then a response signal is sent from the signal transmitting device to the signal gathering device at block 330. At block 340, location information of the entity is calculated and the result is used appropriately by an end user application at block 350. If on the other hand, at block 320, the signal gathering device does not get a response to the query sent, then at block 360 the signal gathering device concludes that the entity is either out of range or not present.

According to another embodiment of the present invention, the signal transmitting device is a Radio Frequency Identification (RFID) tag attached to the entity whose location information is needed. For example, the entity may be a non-animated object like a book in a library, an item like furniture, a gadget, an electronic item, a wireless LAN PCMCIA card, or an animated object like an employee of a company. RFID tags are also attached to mobile electronic devices that do not emit infrared or radio signals. In one embodiment, a RFID tag is attached to an employee identification badge or other objects such as cellular phones and PDAs that are carried by the employee.

Figure 4:
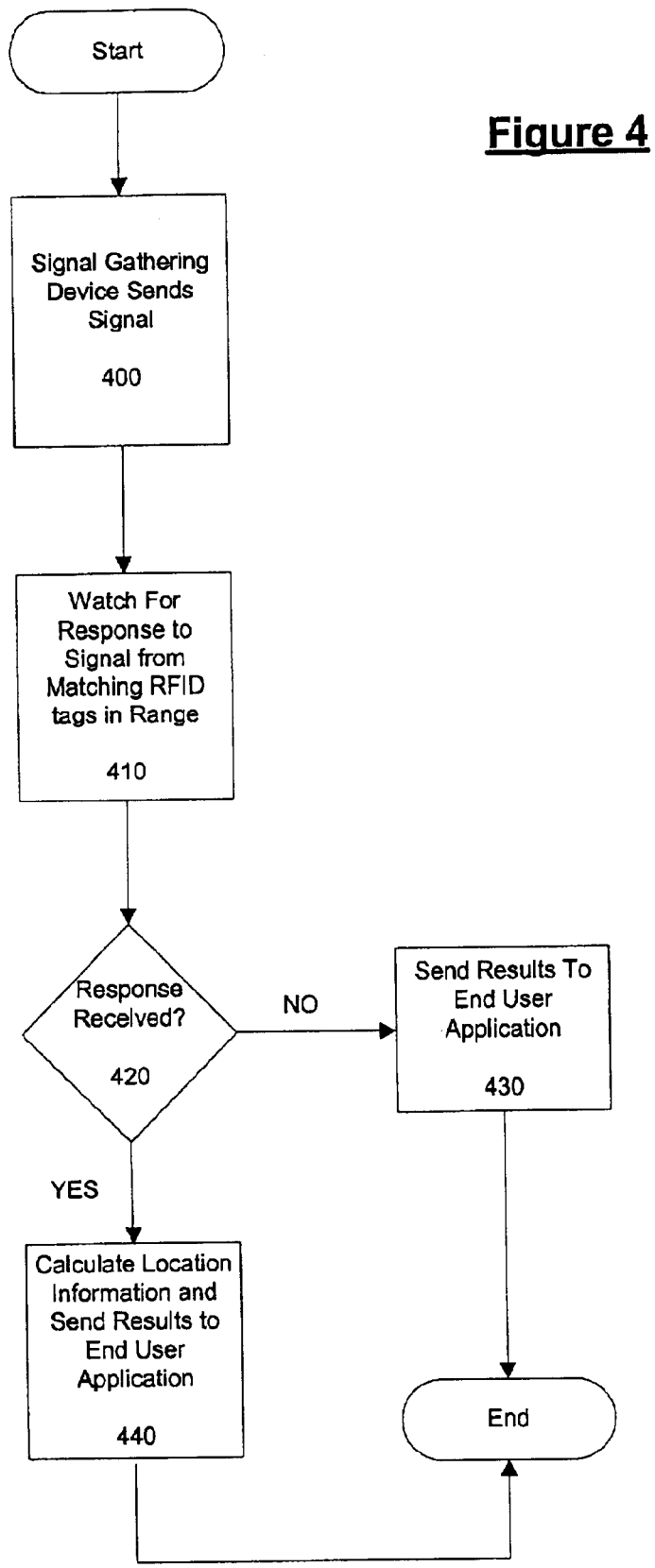
FIG. 4 illustrates a scenario where a RFID tag attached to an entity is used to pinpoint location information of the entity according to an embodiment of the present invention.

FIG. 4 illustrates a scenario whereby a RFID tag is used to pinpoint location information of an entity. At block 400, a signal (or query) is transmitted from a signal gathering device. In one embodiment, the signal gathering device is a collection of antennas and one of the antennas is a transmitting antenna that sends the query. At block 410, the signal gathering device watches for the response to the query from matching RFID tags within range. The query may be limited to a certain range of RFID (e.g. printers only vs. all devices). Thus other RFID tags may be in range and not respond to the query. If at block 420 a determination is made to see if a response (or responses) is received by the signal gathering device. If no response is received (indicating that the RFID tags are either out of range or do not match the query), then at block 430 the results are given to the end user application for appropriate action. If on the other hand a response (or responses) is received at block 420 (indicating that the RFID tag(s) corresponding to the query exists and is within range), then at block 440 the location of the RFID tag(s) is calculated and the results are sent to the end user application.

Signal Gathering Devices

According to one embodiment of the present invention, the signal gathering device is a collection of antennas. An antenna can send a signal to query the presence of an entity. An antenna can also gather signals emitted from mobile electronic devices or from signal transmitting devices attached to entities. In one embodiment, the signal gathering device is a collection of wall mounted antennas in an indoor space (e.g. an office, a home, a library, or a shop, etc). These wall mounted antennas, which may be flat wall mounted antennas, gather the response from a passive RFID tag attached to an entity, or a RFID transceiver attached to a book in a library, an employee ID badge, or a printer in an office, or from radio signals emitted from an active mobile electronic device such as a Bluetooth™ transmitter. In one embodiment, at least three wall mounted antennas are needed in order to pinpoint accurately the location of a signal transmitting device such as a RFID tag.

Figure 5:
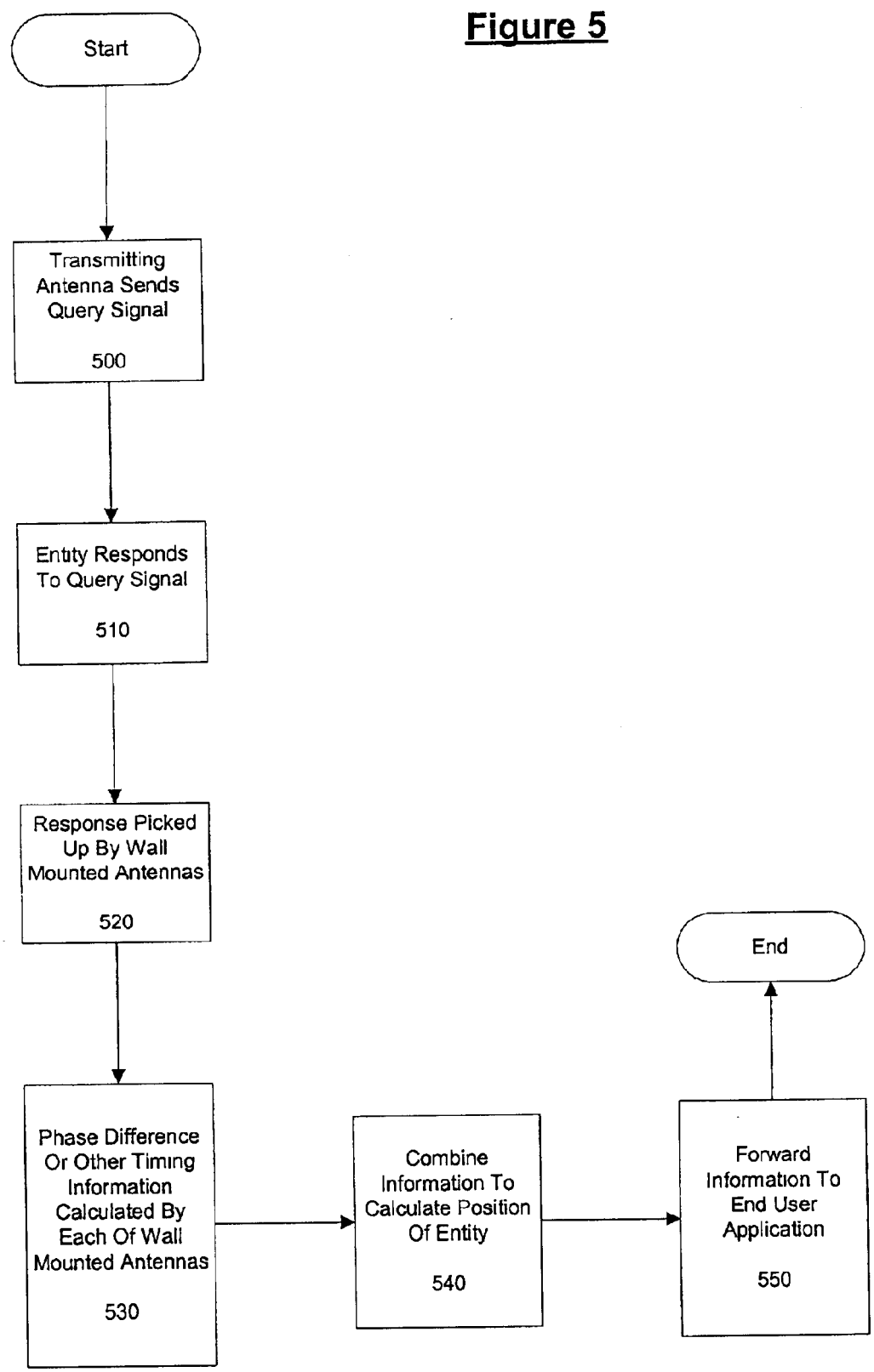
FIG. 5 illustrates a scenario where a RFID transceiver like a printer in an office responds to a signal sent by a transmitting antenna according to an embodiment of the present invention.

FIG. 5 illustrates a scenario where a RFID transceiver attached to a printer in an office responds to a signal sent by a transmitting antenna. At block 500, the transmitting antenna sends a query signal to locate a particular printer in an office. At block 510, the printer responds to the query by sending a signal, which at block 520 is picked up by the wall mounted antennas in the office. At block 530, the phase difference of the response or other timing information is gathered by each of the three wall mounted antennas. At block 540, the common information received at the three wall mounted antennas is combined and the distance of the printer is calculated. At block 550, this information is forwarded to other systems such as access control mechanisms, data banks, or end user applications to be used appropriately.

Figure 6:
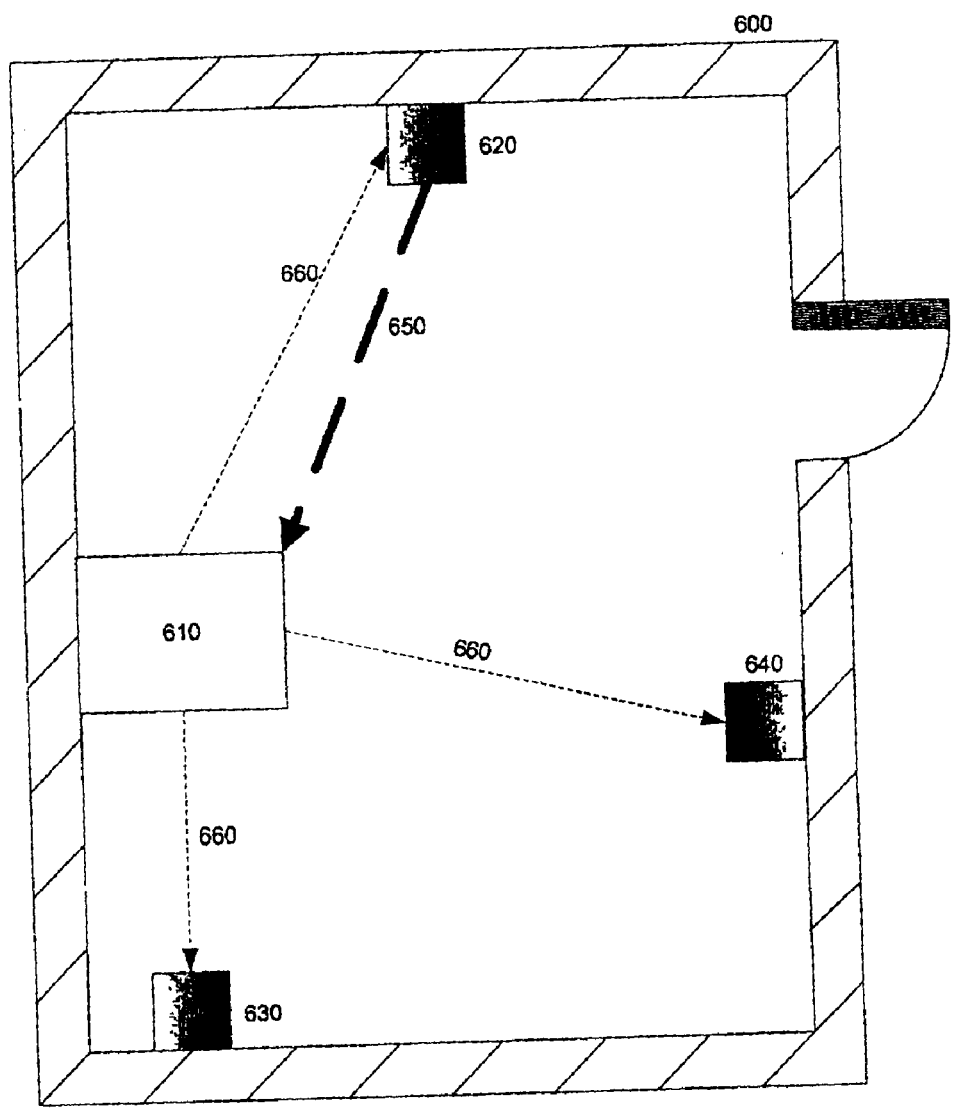
FIG. 6 is an illustration of an embodiment of the present invention showing the wall mounted antennas.

FIG. 6 illustrates a plan view of a room 600, containing a RFID transceiver 610 and three walled mounted antennas numbered 620, 630 and 640. A query signal is sent from antenna 620, which is marked by a bold dotted line 650. RFID transceiver 610 responds to the query signal, which is picked up by all 3 wall mounted antennas. This response is shown by a slim dotted line 660. After calculating the phase difference or other timing information, each antenna sends its results, which are combined to calculate the exact position of RFID transceiver 610. This information is forwarded to an end user application that uses the information appropriately.

Figure 7A:
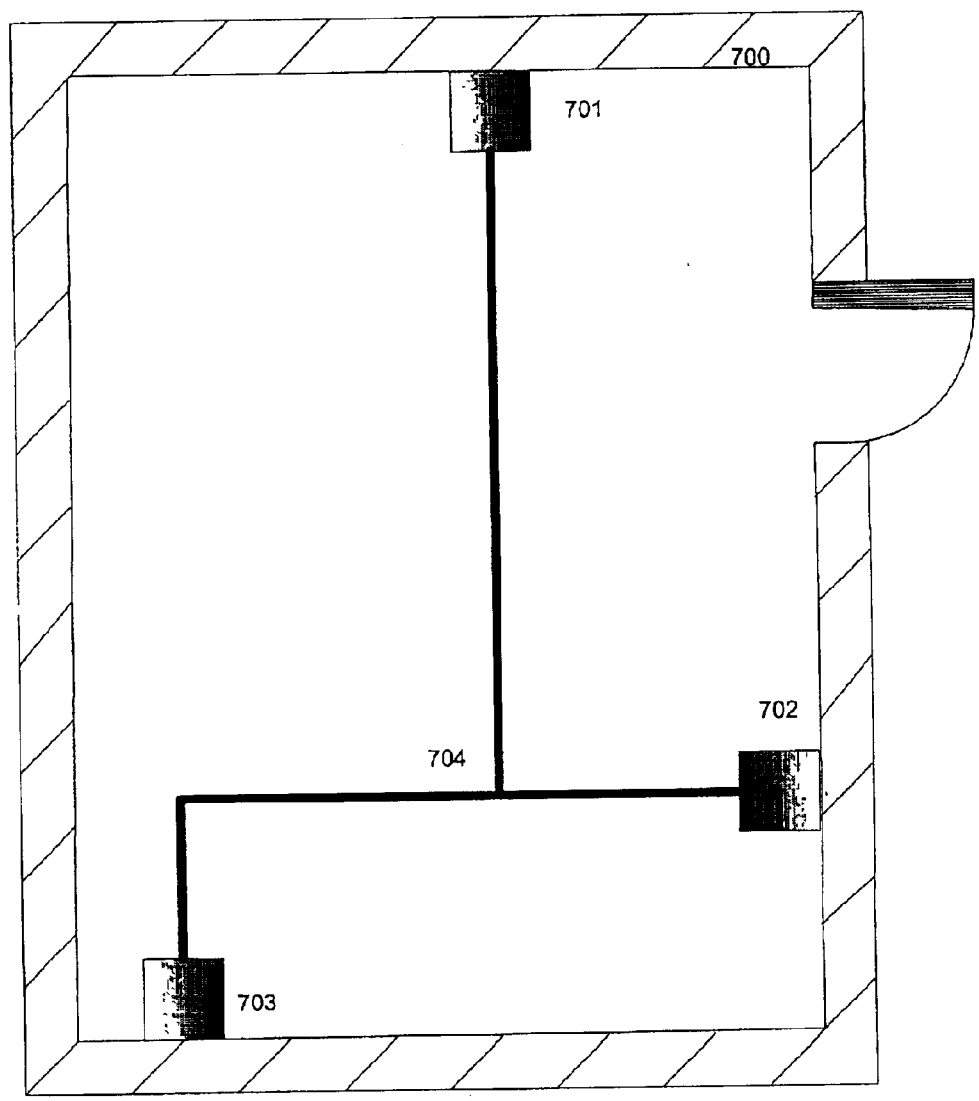
FIG. 7A is an illustration of a collection of antennas connected by electric circuitry according to an embodiment of the present invention.
Figure 7B:
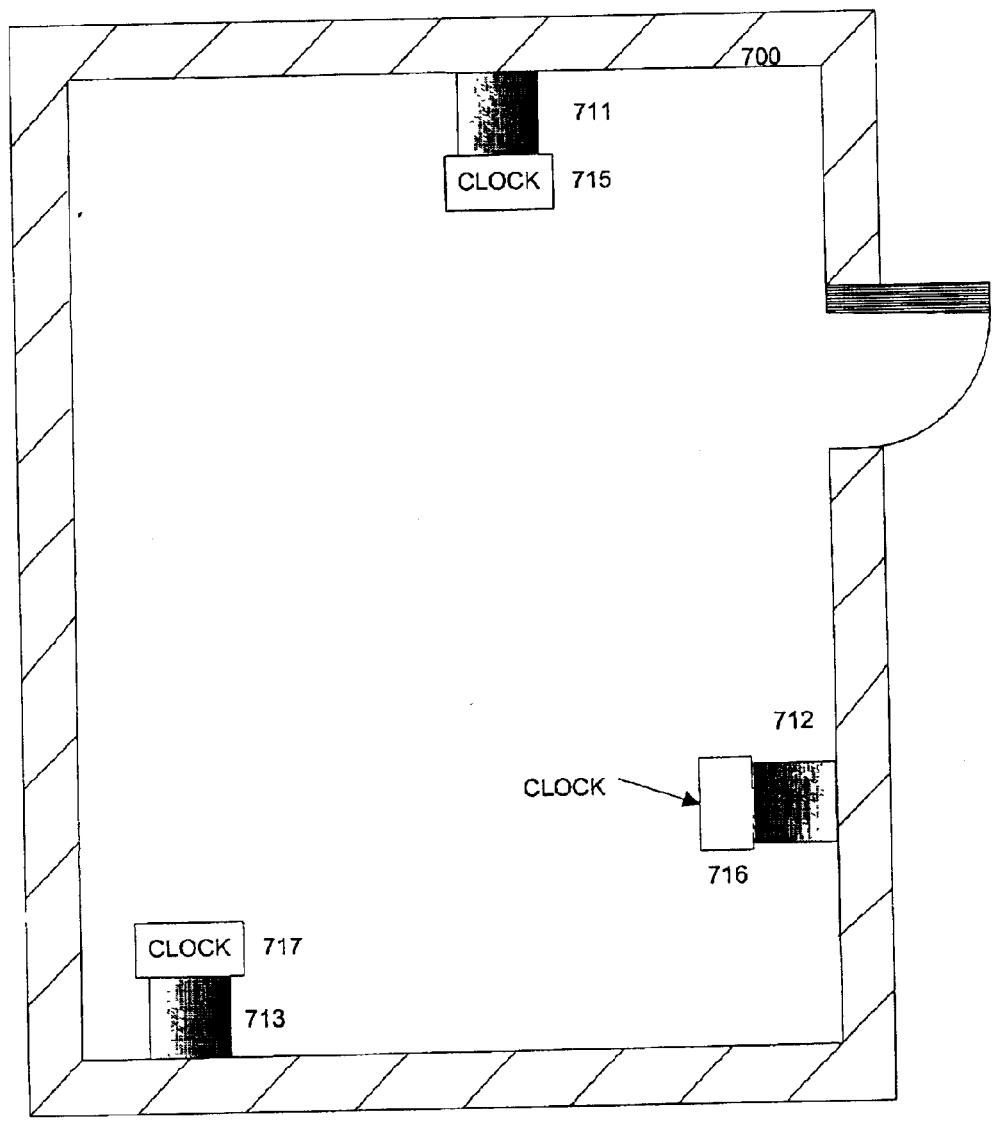
FIG. 7B is an illustration of a collection of antennas with precise internal clocks according to an embodiment of the present invention.

FIG. 7A shows one embodiment of the present invention in which all antennas within a given space are electrically connected to each other. Electric circuitry 704 connects antennas 701, 702 and 703 and allows them to jointly figure out time delay and phase shift of incoming signal. The result indicates the position of the sender. FIG. 7B shows another embodiment that has each antenna carrying a very precise clock. Each antenna (711, 712 and 713) uses its clock (715, 716, 717) to timestamp the incoming signal. By collecting time delays of several transceivers, the central processing device can then figure out where the RFID tags are located. In this embodiment, the antennas need not to be connected by electric circuitry.

Figure 7C:
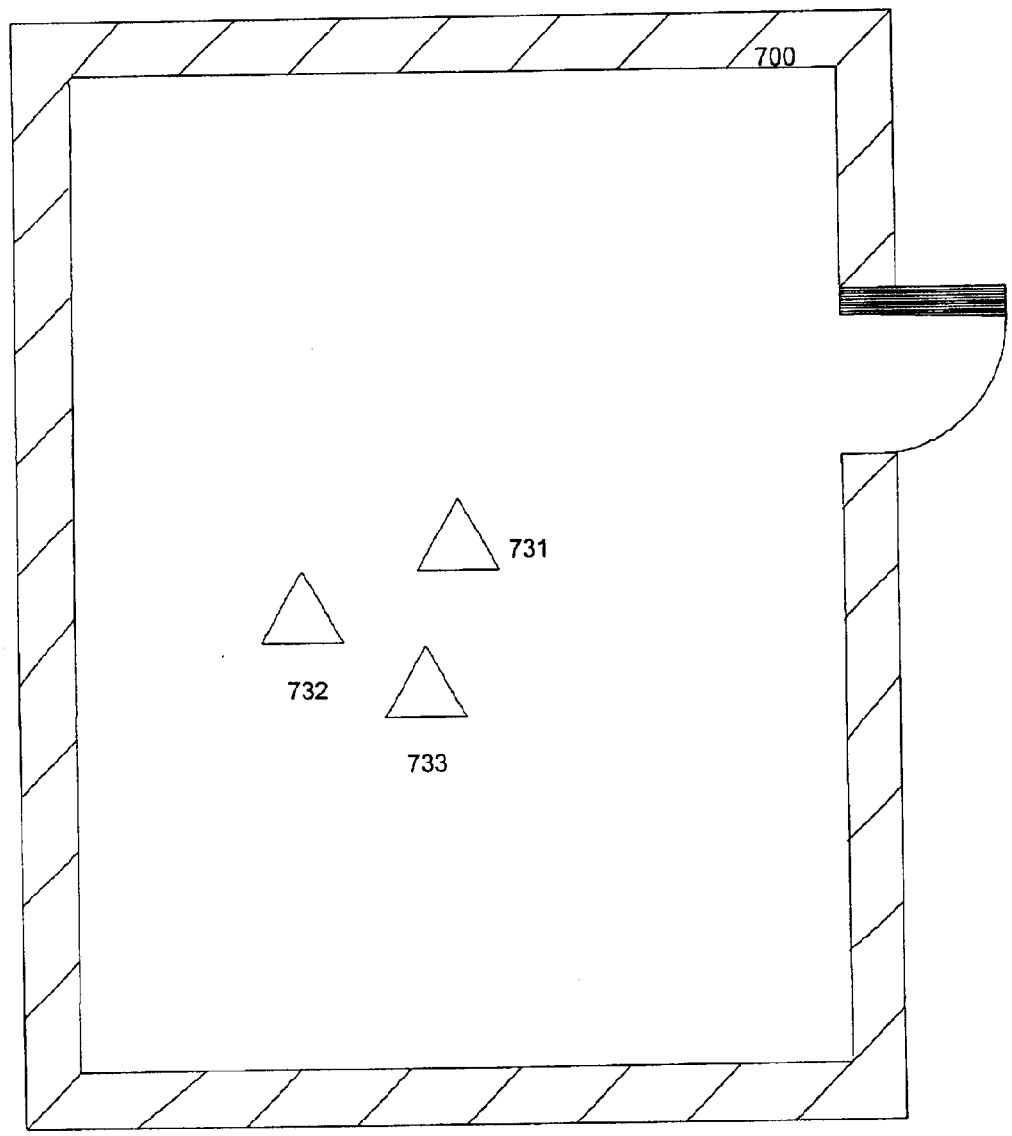
FIG. 7C is an illustration of a collection of direction-finding antennas according to an embodiment of the present invention.

FIG. 7C shows another embodiment of the present invention. In this embodiment the signal gathering device is a collection of passive antennas that have direction finding capabilities. Instead of having several antennas spaced far apart that need to be connected, a small cluster of direction finding antennas 731, 732 and 733 are installed in the room. Each direction finding antenna generates angular information (in one plane). The information can then be combined to find the location of the signal sender such as RFID tag.

Figure 7D:
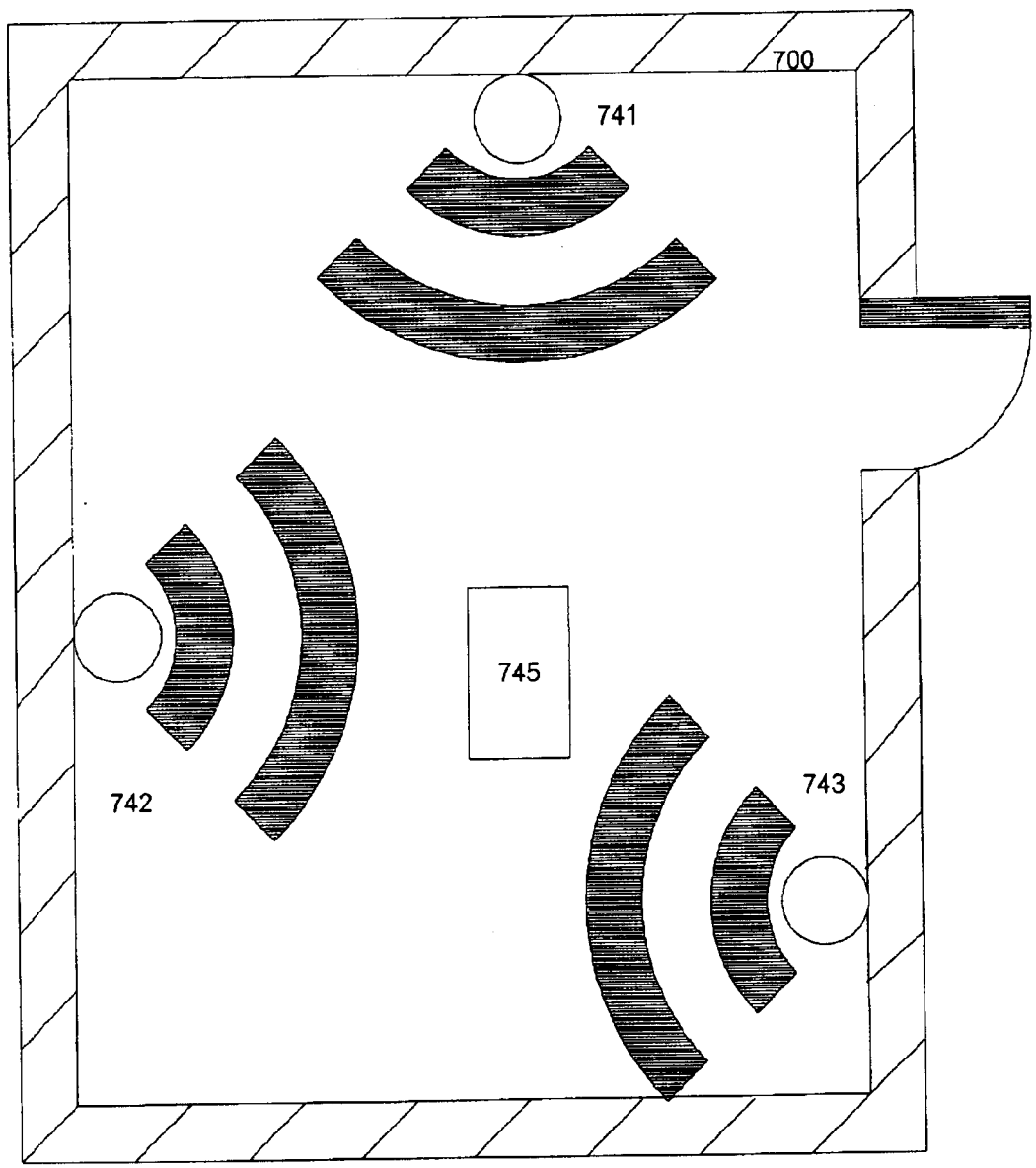
FIG. 7D is an illustration of a collection of antennas equipped with Bluetooth™ interfaces according to an embodiment of the present invention.

FIG. 7D shows yet another embodiment in which the signal gathering device is a collection of RFID transceivers that are scattered in the room and bolted down at fixed locations. Each transceiver in the figure (741, 742 and 743) is equipped with a Bluetooth™ interface to access central processing device 745. Each transceiver queries the room for RFID tags (or other signal senders) on its own and measures time delays of responses. By collecting time delays of several transceivers, the central processing device can then figure out where the RFID tags are located.

Figure 7E:
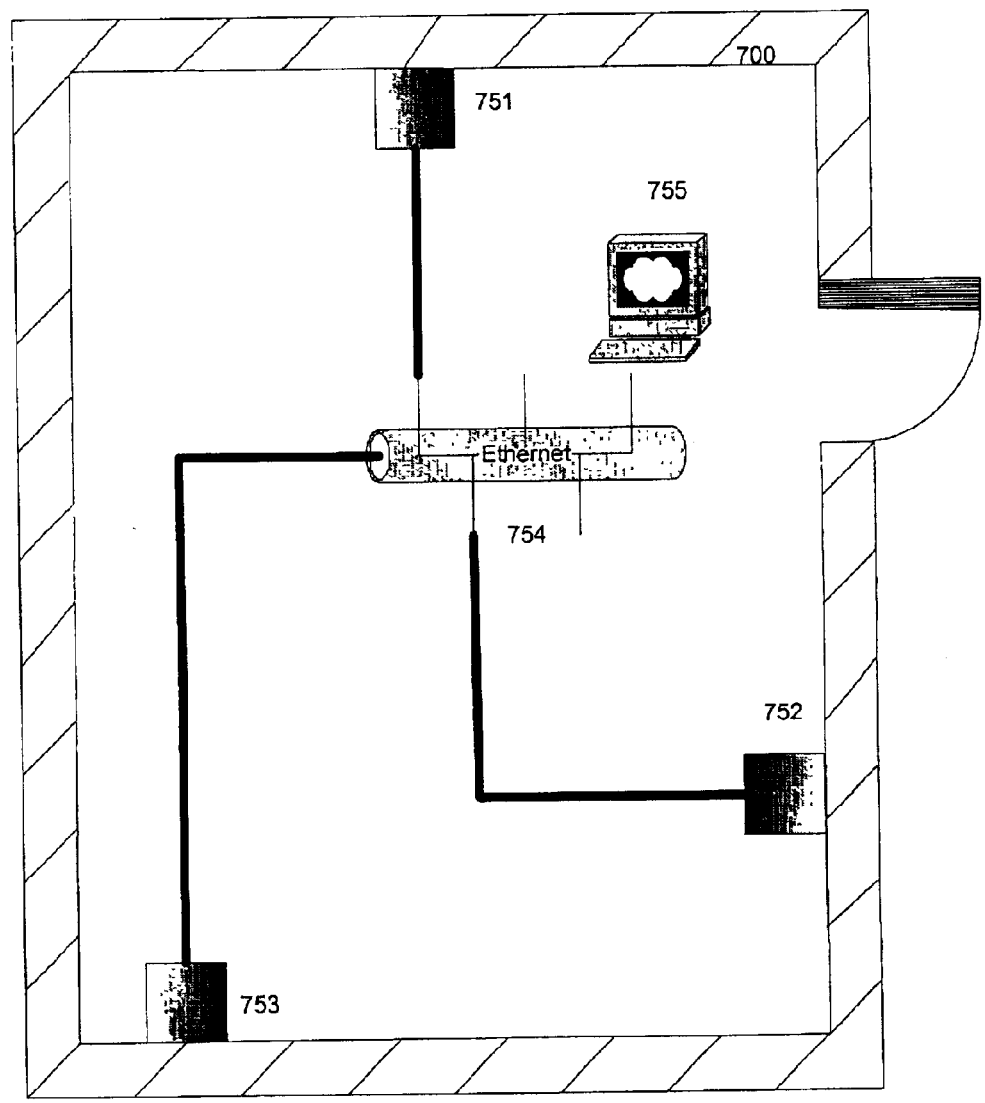
FIG. 7E is an illustration of a collection of antennas connected by ethernet to a central processing device according to an embodiment of the present invention.
Figure 8:
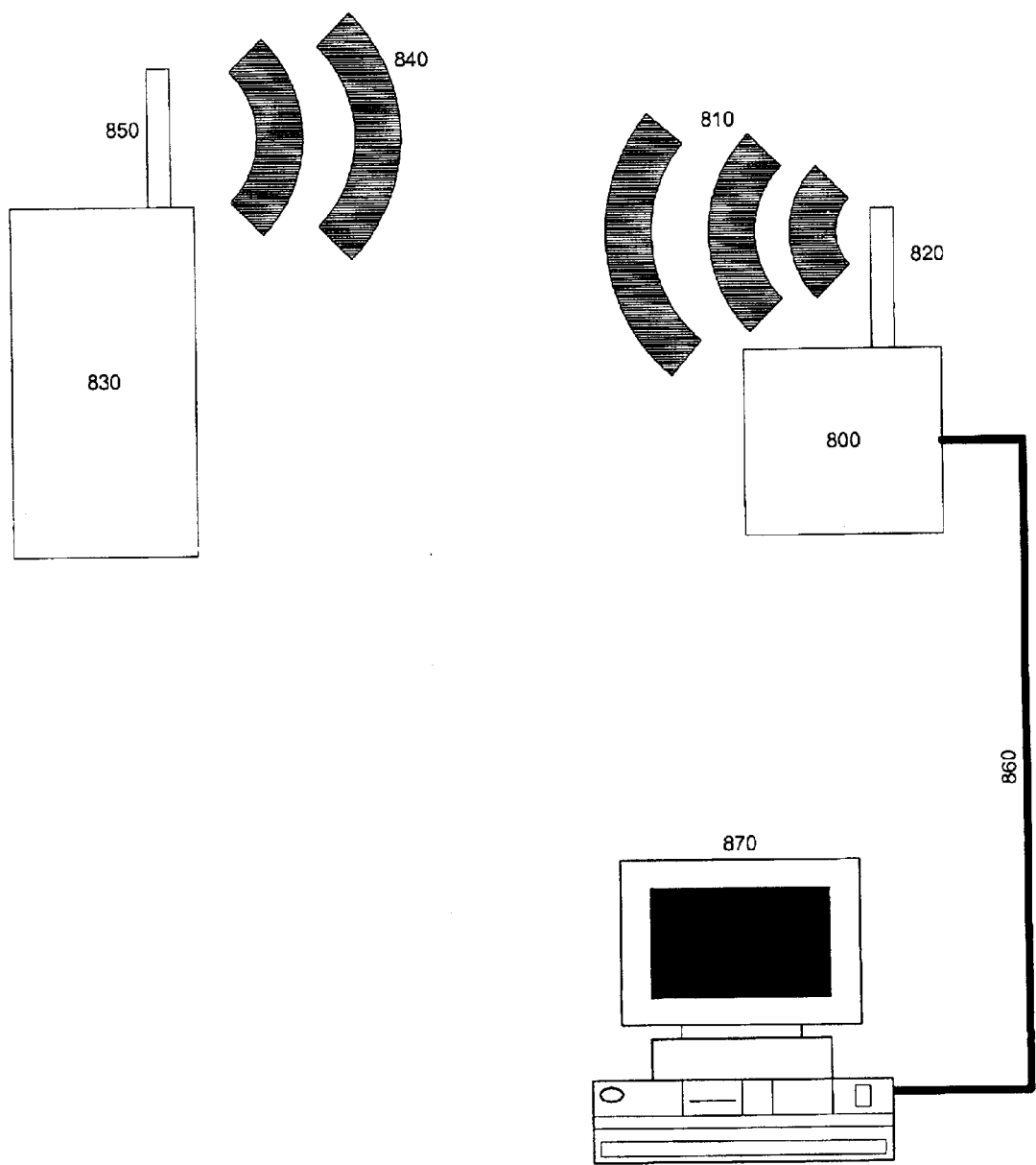
FIG. 8 illustrates a scenario of a prior art system transferring data using RFID technology.

FIG. 7E shows an embodiment of the present invention. In this embodiment, RFID transceivers 751, 752 and 753 are wired together to central processing device 755 via ethernet connection 754. Each transceiver queries the room for RFID tags (or other signal senders) on its own and measures time delays of responses. By collecting time delays of several transceivers, the central processing device can then figure out where the RFID tags are located.

Both embodiments in FIGS. 7D and 7E also allow for mobile electronic devices to be modified to query the transceivers in the room. Thus each mobile electronic device will be able to perform its own location calculation and send the information to the central processing device. One way to perform the calculation would be for the mobile electronic device to ping each transceiver until a reply comes back. Then the mobile electronic device can gather the different replies and find its location. Since the calculation is delegated, the overhead costs of the position calculation can be reduced. It is also important to note that the number of antennas and transceivers shown in FIGS. 7A–7E is for illustrative purpose only. Other embodiments may employ more or less antennas for a given indoor space.

Using Location Information

Embodiments of the present invention use the location information gathered for various applications. In one embodiment, the location information is used to identify misplaced items such as misplaced books in the library. In yet another embodiment, the location information of employee ID tags is used as additional authentication parameters to grant access and entry.

Figure 9:
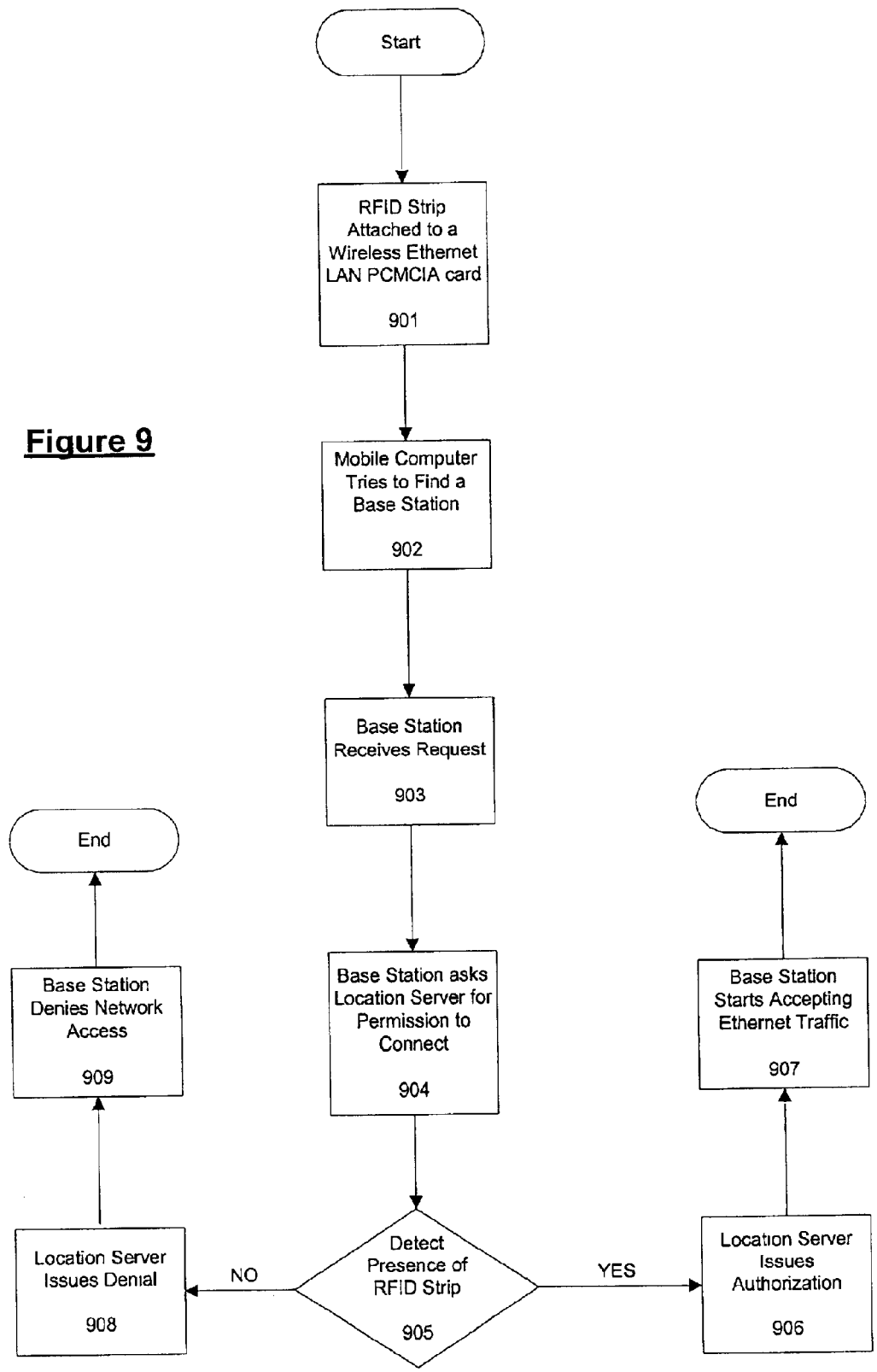
FIG. 9 illustrates the operation of a network security application according to an embodiment of the present invention.

According to one embodiment of the present invention, the location information of wireless LAN PCMCIA ethernet cards can be used to allow or deny access to a corporate wireless network to deter hackers who are outside of the corporate building premise. FIG. 9 shows this embodiment. At block 901, a RFID strip is attached to a wireless ethernet card. At block 902, the mobile computer to which this ethernet card is attached attempts to find a base station so the computer can talk to the company internal wireless network. This is part of the IEEE 802.11 standard. At block 903, a base station receives the request to connect to the network from the ethernet card. In prior art implementations, the base station would perform verification procedures. Examples of such procedures include operations such as verifying WEP key of the ethernet card or ethernet address of the card. In this embodiment of the present invention, in addition to performing such verification procedures, the base station connects to a location server and asks the location server for permission to connect the ethernet card at block 904. The location server contains the ethernet address of the ethernet card and the RFID of its attached RFID strip. The location server then sends a query through the network of signal gathering devices (e.g. antennas) to detect the presence of the RFID strip at block 905. If the RFID strip is found, then the location server can issue an authorization back to the base station at 906. Then at block 907, the base station starts accepting ethernet traffic from the ethernet card and relaying it onto the corporate wireless network, and vice versa. If the RFID strip attached to the ethernet card is not found, then the location server issues a denial at block 908 back to the base station. The base stations then issues an "access denied" message back to the ethernet card at block 909.

It is important to note that the location server may also have location information of all RFID tags that are currently visible to it. It may also have a database which correlates RFID serial numbers with identification data of the devices (e.g. the ethernet address of a wireless card) to which the RFID tags are attached. Thus, when an access point asks about a particular ethernet address, the location server knows to which RFID serial number this corresponds. After a query, it will make an access control decision, based on the position of the RFID tag (e.g. inside of the building vs. outside of the building).

Figure 11:
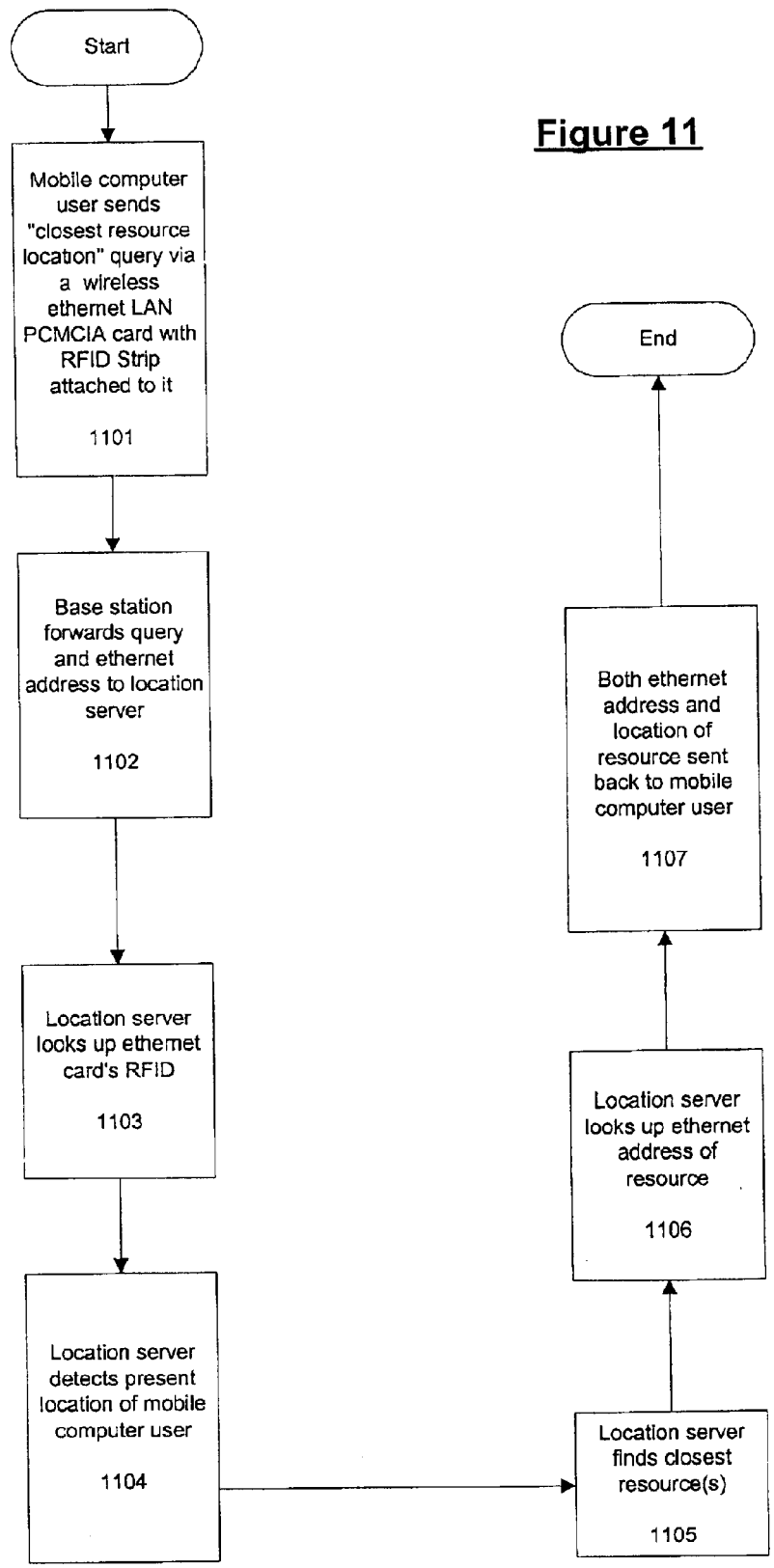
FIG. 11 illustrates the operation of a network resource locator application according to an embodiment of the present invention.

In another embodiment, the location server can facilitate the location of resources on the wireless corporate network. Resources such as scanners and printers are equipped with ethernet card/RFID strip combination. The location server can direct the mobile computer user to the nearest resources on the wireless network based on the location of the ethernet card on the mobile computer. FIG. 11 shows this embodiment. At block 1101, a mobile computer user sends a "closest resource location query" to the base station via an ethernet card that has a RFID strip attached to it. For example, the query can ask for the closest printer. The base station then forwards the ethernet card address of the mobile user and the query to the location server at block 1102. At block 1103, the location server looks up the ethernet card address and finds its corresponding RFID. At block 1104, with the RFID, the location server uses the network of antennas to detect the present location of the ethernet card. At block 1105, it finds the closest resources to the mobile computer user by querying for all matching resources near the present location of the ethernet card. In one embodiment, the location server already has a record of the location of all resources. In another embodiment the location server sends the query to the network of antennas. At block 1106, the RFID of the closest resource is found and the location server then looks up the ethernet address of the resource in reverse. Both the ethernet address and the location of the resource are sent back to the mobile computer user at block 1107. In the printer example, the mobile computer can then use the ethernet address of the printer to send its print job and the user can use the location information of the printer to find the printer and pick up the print job. In another embodiment, multiple matches may be returned to the mobile computer user.

FIG. 12 shows a security application according to another embodiment of the present invention. The security application uses the location information to identify and react to unwanted displacement of equipment and property to prevent theft or vandalism. At block 1201, a RFID tag is attached to the entity in question. In one embodiment, the entity carries sensitive information and must remain within a secured area. At block 1202, the boundaries of secured area and unsecured area are defined within the location server. At block 1203, a location server monitors the location of the entity by sending periodic queries. A detection of whether the entity is moved to an unsecured area (or out of range) is made at block 1204. If it is, then the location server issues an alert at block 1205.

Embodiment of a Computer Execution Environment

Figure 10:
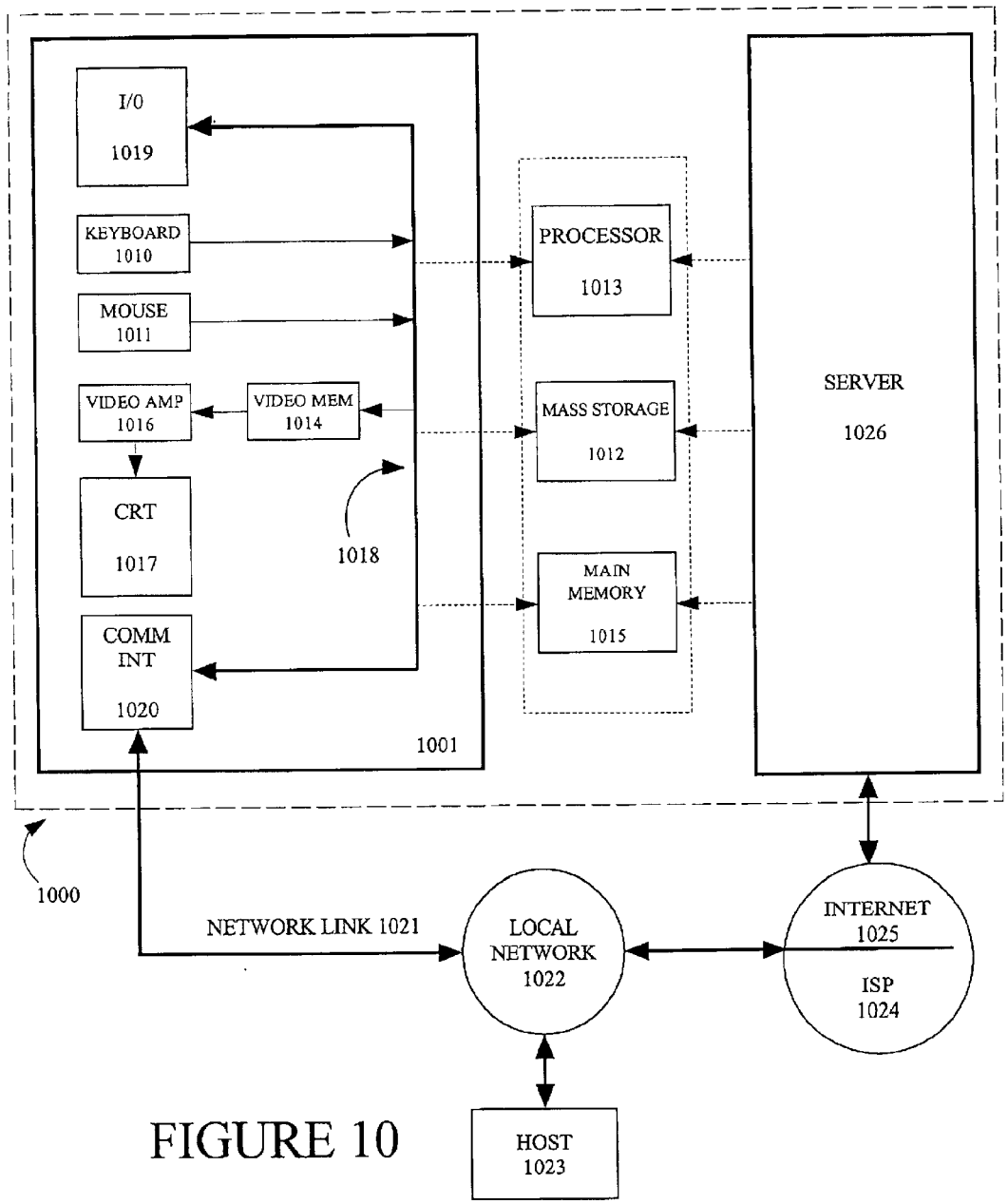
FIG. 10 is an illustration of an embodiment of a computer execution environment.

One or more embodiments of the present invention makes location positioning devices and/or location gathering devices using a general purpose computing environment such as environment 1000 illustrated in FIG. 10. A keyboard 1010 and mouse 1011 are coupled to a bi-directional system bus 1018. The keyboard and mouse are for introducing user input to a computer 1001 and communicating that user input to processor 1013.

Computer 1001 may also include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals, which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals, which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output. Other suitable input devices may be used in addition to, or in place of, the mouse 1011 and keyboard 1010. I/O (input/output) unit 1019 coupled to bidirectional system bus 1018 represents such I/O elements as a printer, A/V (audio/video) I/O, etc.

Computer 1001 includes a video memory 1014, main memory 1015 and mass storage 1012, all coupled to bidirectional system bus 1018 along with keyboard 1010, mouse 1011 and processor 1013.

As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture developed by Sun Microsystems, Inc., the palm pilot computing device, Internet ready cellular phones, and other Internet computing devices.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014, and mass storage 1012. Alternatively, multiplex data/address lines may be used instead of separate data and address lines.

In one embodiment of the invention, the processor 1013 is a microprocessor manufactured by Motorola, such as the 680×0 processor or a microprocessor manufactured by Intel, such as the 80×86 or Pentium processor, or a SPARC microprocessor from Sun Microsystems, Inc. However, any other suitable microprocessor or microcomputer may be utilized. Main memory 1015 is comprised of dynamic random access memory (DRAM). Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022, and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, an apparatus and a method for the use of position information of a device in wireless applications is described in conjunction with one or more specific embodiments. The embodiments of the present invention are defined by the following claims and their full scope of equivalents.

We claim:

1. A method of enforcing network security comprising:

attaching a RFID strip to a wireless ethernet network card;

mounting a plurality of antennas in a space;

connecting said antennas to a location server;

using said antennas to obtain location information of said RFID strip;

sending said location information to said location server; and using said location information to grant or deny network access requests generated by said wireless ethernet network card.

2. The method of claim 1 wherein said step of using said location information further comprises:

using said location server to store ethernet address of said ethernet card; and matching said ethernet address to said location information of said RFID strip.

3. A method of locating network resources comprising:

attaching RFID strips to a plurality of network resources;

attaching a RFID strip to a wireless ethernet network card used by a resource requester;

mounting a plurality of antennas in a space;

connecting said antennas to a location server;

taking a resource request from said resource requester;

using said antennas to obtain location information of each of said plurality of network resources; and using said location information to locate a resource nearest to said resource requester.

4. An apparatus for enforcing network security comprising:

a RFID strip attached to a wireless ethernet network card;

a plurality of antennas mounted in a space; and a location server connected to said plurality of antennas whereby said antennas are used to obtain location information of said RFID strip and said location information is used by said location server to grant or deny network access requests generated by said wireless ethernet network card.

5. The apparatus of claim 4 wherein said location server stores ethernet address of said ethernet card and matches said ethernet address to said location information of said RFID strip.

6. An apparatus for locating network resources comprising:

a plurality of RFID strips attached to a plurality of network resources;

a RFID strip attached to a wireless ethernet network card used by a resource requester;

a plurality of antennas mounted in a space; and a location server connected to said plurality of antennas whereby said location server takes a resource request from said resource requester and uses said antennas to obtain location information of each of said plurality of network resources and locate a resource nearest to said resource requester.

* * * * *